US007653802B2

(12) United States Patent
Morais et al.

(10) Patent No.: US 7,653,802 B2
(45) Date of Patent: Jan. 26, 2010

(54) SYSTEM AND METHOD FOR USING ADDRESS LINES TO CONTROL MEMORY USAGE

(75) Inventors: Dinarte R. Morais, Redmond, WA (US); Jeffrey A. Andrews, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 65 days.

(21) Appl. No.: 10/928,786

(22) Filed: Aug. 27, 2004

(65) Prior Publication Data

US 2006/0047936 A1 Mar. 2, 2006

(51) Int. Cl.
*G06F 9/32* (2006.01)
(52) U.S. Cl. .................. 711/207; 711/200; 711/202
(58) Field of Classification Search .............. 711/207, 711/200, 202
See application file for complete search history.

(56) References Cited

U.S. PATENT DOCUMENTS

| 3,668,651 | A |   | 6/1972  | Hornung ............. 340/172.5 |
|-----------|---|---|---------|--------------------------------|
| 3,742,458 | A | * | 6/1973  | Inoue et al. ............ 711/154 |
| 3,827,029 | A | * | 7/1974  | Schlotterer et al. ....... 711/163 |
| 3,829,840 | A |   | 8/1974  | Burke et al. ........... 340/172.5 |
| 4,476,524 | A |   | 10/1984 | Brown et al. ............ 710/306 |
| 4,740,916 | A |   | 4/1988  | Martin ................. 711/115 |
| 4,771,458 | A |   | 9/1988  | Citta et al. |
| 5,058,164 | A |   | 10/1991 | Elmer et al. |
| 5,081,675 | A |   | 1/1992  | Kittirutsunetorn |
| 5,224,166 | A |   | 6/1993  | Hartman, Jr. ............ 713/190 |
| 5,233,616 | A |   | 8/1993  | Callander |
| 5,347,428 | A |   | 9/1994  | Carson et al. |
| 5,421,006 | A |   | 5/1995  | Jablon et al. ............ 714/36 |
| 5,426,750 | A |   | 6/1995  | Becker et al. |
| 5,455,862 | A |   | 10/1995 | Hoskinson |
| 5,634,108 | A |   | 5/1997  | Freeman |

(Continued)

FOREIGN PATENT DOCUMENTS

EP 0 186 230 7/1986

(Continued)

OTHER PUBLICATIONS

Suh, et al. "AEGIS: Architecture for Tamper-Evident and Tamper-Resistant Processing" 2003. ACM 1-58113-733-Aug. 3, 2006.*

(Continued)

*Primary Examiner*—Sanjiv Shah
*Assistant Examiner*—Shawn Eland
(74) *Attorney, Agent, or Firm*—Woodcock Washburn LLP

(57) ABSTRACT

A computing environment maintains the integrity of data stored in system memory. The system has a memory management unit that maintains a plurality of real page numbers. The system also comprises an address bus in communication with the memory management unit. The address bus comprises a plurality of address lines, wherein a value of at least one address line is set by a real page number from the memory management unit. The system has an operating system that controls memory usage by controlling the real page numbers stored in said page table that is accessed by the memory management unit. At least one security feature such as data encryption is selectively applied to data stored in a page of said memory as enabled by a value of said address line set by said real page number.

22 Claims, 9 Drawing Sheets

U.S. PATENT DOCUMENTS

| | | | |
|---|---|---|---|
| 5,638,512 | A | 6/1997 | Osman et al. |
| 5,652,793 | A | 7/1997 | Priem et al. ............... 705/56 |
| 5,825,878 | A | 10/1998 | Takahashi et al. .......... 713/190 |
| 5,892,826 | A | 4/1999 | Brown et al. |
| 5,944,821 | A | 8/1999 | Angelo ................ 713/200 |
| 6,026,293 | A | 2/2000 | Osborn |
| 6,151,618 | A | 11/2000 | Wahbe et al. ............ 718/1 |
| 6,195,752 | B1 | 2/2001 | Pfab |
| 6,199,163 | B1 | 3/2001 | Dumas et al. |
| 6,292,892 | B1 | 9/2001 | Davis .................. 713/156 |
| 6,633,963 | B1 | 10/2003 | Ellison et al. ............ 711/163 |
| 6,651,171 | B1 | 11/2003 | England et al. ........... 713/193 |
| 6,704,871 | B1 | 3/2004 | Kaplan et al. ............ 713/192 |
| 6,735,673 | B2 | 5/2004 | Kever |
| 6,745,307 | B2 | 6/2004 | McKee .................. 711/163 |
| 6,778,667 | B1 | 8/2004 | Bakhle et al. ............ 380/37 |
| 6,934,817 | B2 | 8/2005 | Ellison et al. ............ 711/153 |
| 7,075,546 | B2 | 7/2006 | Rai et al. |
| 7,107,459 | B2 | 9/2006 | Caronni et al. |
| 7,111,146 | B1 * | 9/2006 | Anvin .................. 711/207 |
| 7,117,373 | B1 | 10/2006 | Trimberger et al. |
| 7,124,274 | B2 * | 10/2006 | Watt et al. .............. 711/202 |
| 7,124,302 | B2 | 10/2006 | Ginter et al. ............ 713/189 |
| 7,266,842 | B2 | 9/2007 | Foster et al. |
| 7,269,742 | B2 | 9/2007 | Gammel et al. |
| 7,313,705 | B2 | 12/2007 | Turkboylari |
| 7,356,668 | B2 | 4/2008 | Morais et al. |
| 7,444,523 | B2 | 10/2008 | Morais et al. |
| 7,526,654 | B2 | 4/2009 | Charbonneau |
| 2002/0007456 | A1 | 1/2002 | Peinado et al. ............ 713/164 |
| 2002/0016846 | A1 | 2/2002 | Ono .................... 709/229 |
| 2002/0147918 | A1 | 10/2002 | Osthoff et al. |
| 2002/0150243 | A1 | 10/2002 | Craft et al. .............. 380/201 |
| 2003/0101322 | A1 * | 5/2003 | Gardner ................. 711/163 |
| 2003/0140245 | A1 * | 7/2003 | Dahan et al. ............ 713/200 |
| 2003/0188178 | A1 | 10/2003 | Strongin et al. .......... 713/193 |
| 2003/0204693 | A1 * | 10/2003 | Moran et al. ............ 711/163 |
| 2004/0151319 | A1 | 8/2004 | Proudler ................. 380/277 |
| 2006/0047972 | A1 | 3/2006 | Morais et al. |
| 2006/0059553 | A1 | 3/2006 | Morais et al. |
| 2007/0014412 | A1 | 1/2007 | Rollins |
| 2007/0136543 | A1 * | 6/2007 | Ehama et al. ............ 711/163 |

FOREIGN PATENT DOCUMENTS

| | | |
|---|---|---|
| EP | 0 908 810 | 4/1999 |
| WO | WO 98/36517 | 8/1998 |
| WO | WO 00/26791 | 5/2000 |

OTHER PUBLICATIONS

Intel Communications. "Intel 186/386/486 Processors" 2002. Order No. 251397-001.*

"Computer Memory," http://ncca.bournemouth.ac.uk/CourseInfo/BAVisAn/Year1/CompSys/Memory/, Jan. 18, 1996, 4 pages.

"Address Decode—General IO," http://www.onastick.clara.co.uk/address.htm, 1992, 6 pages.

Black, J. et al., "UMAC: Fast and Secure Message Authentication," *Advances in Cryptology—CRYPTO '99*, Lecture Notes in Computer Science, Wiener, M. (ed.), 1999, vol. 1666, 18 pages.

Engler, D. et al., "The Operating System Kernel as a Secure Programmable Machine," *Proceedings of the 6th Workshop on ACM SIGOPS European Workshop: Matching Operating Systems to Application Needs*, Wadern, Germany, 1994, 62-67.

Halevi, S. et al., "A Tweakable Enciphering Mode," *Advances in Cryptology—CRYPTO '03*, Lecture Notes in Computer Science, Boneh, D. (ed), 2003, vol. 2729, 33 pages.

Jutla, C.S., "Encryption Modes with Almost Free Message Integrity," *Proceedings of the International Conference on the Theory and Application of Cryptographic Techniuqes: Advances in Cryptology*, 2001, 15 pages.

Kirovski, D. et al., "Enabling Trusted Software Integrity," *Proceedings of the 10th International Conference on Architectural Support for Programming Languages and Operating Systems*, San Jose, California, 2002, 108-120.

Lie, D. et al., "Implementing an Untrusted Operating System on Trusted Hardware," *Proceedings of the 19th ACM Symposium on Operating Systems Principles*, Bolton Landing, New York, 2003, 178-192.

Lie, D. et al., "Architectural Support for Copy and Tamper Resistant Software," *ACM SIGPLAN Notices*, 2000, 35(11), 8 pages.

Schroeder, M.D. et al., "A Hardware Architecture for Implementing Protection Rings," *Communications of the ACM*, Mar. 1972, 15(3), 157-170.

Suth, G.E. et al., "AEGIS: Architecture for Tamper-Evident and Tamper-Resistant Processing," *Proceedings of the ICS*, San Francisco, California, 2003, 160-171.

Suh, G.E. et al., "Hardware Mechanisms for Memory Integrity Checking," 2002, 18 pages.

Suh, G. E. et al., "Efficient Memory Integrity Verification and Encryption for Secure Processors," *Proceedings of the 36th International Symposium on Microarchitecture*, 2003, 1-12.

Wetzel, J. et al., "PowerPC Operating Environment Architecture," Dec. 2003, *Book III, Version 2.01*, Table of Contents and pp. 1-119.

Wu, M. et al., "Improving TLB Miss Handling with Page Table Pointer Caches," Dec. 1997, 10 pages.

Zachary, J. et al., "Bidirectional Mobile Code Trust Management Using Tamper Resistant Hardware," *Mobile Networks and Applications*, 2003, 8, 137-143.

Gay, C., "M68000 Family Memory Management—Part 2," *Electronic Engineering, Morgan-Grampian Ltd.*, London, 1986, 59-68.

Nevelsteen et al., "Software Performance of Universal Hash Functions," 1999, EUROCRYPT, LNCS 1592, pp. 24-41.

* cited by examiner

SYSTEM AND METHOD FOR USING ADDRESS LINES TO CONTROL MEMORY USAGE

CROSS REFERENCE TO RELATED APPLICATION

This application is related to commonly assigned U.S. patent application Ser. No. 10/928,519, filed Aug. 27, 2004 entitled "System and Method for Using Address Bits to Form an Index into Secure Memory."; application Ser. No. 10/927,729, filed Aug. 27, 2004 entitled "System and Method for Using Address Bits to Affect Encryption"; application Ser. No. 10/928,970, filed Aug. 27, 2004 entitled, "System and Method for Using Address Bits to Signal Security Attributes of Data in the Address Space"; application Ser. No. 10/929,036, filed Aug. 27, 2004, entitled, "System and Method for Applying Security To Memory Reads and Writes".

FIELD OF THE INVENTION

The present invention relates to computer systems, and more particularly, to systems and methods for secure execution of program code within a computer system.

BACKGROUND OF THE INVENTION

Computer systems today are subject to a variety of attacks that can disrupt or disable normal operation of a computer system. Computer viruses, worms, and trojan horse programs are examples of different forms of attack. Attacks can also come directly from unscrupulous users of a computer system. Often these attacks take the form of attempts to modify existing program code executed by the computer system or attempts to inject new unauthorized program code at various stages of normal program execution within the computer system. Systems and methods for preventing such malicious attacks are becoming increasingly important.

A typical computer system comprises computer hardware, an operating system, and one or more application programs. The computer hardware typically comprises a processor (sometimes also referred to as a "central processing unit" or "CPU"), a memory, and one or more system buses that facilitate communication among the various components. Other components of a typical computer system include input/output controllers, a memory controller, a graphics processing unit, an audio controller, and a power supply.

Such systems generally have a small amount of on-chip memory (referred to as cache memory) and a much larger amount of off-chip memory (referred to as system memory). The off-chip memory in such systems is generally not considered to be trustworthy (cache memory may also not be considered trustworthy but can be much easier to protect through hardware mechanisms that prevent an attacker from reading the contents of cache memory). That is, data stored in the large system memory is vulnerable to attack wherein the data could be easily altered in a way that was not intended by the owners of the data. Such an attack would cause a program to operate in an unintended manner or allow copy protection scheme to be defeated.

A number of systems have been developed that try to ensure that the data retrieved from system memory can be secured. In particular, systems have employed extensive encryption techniques as well as other tamper evident mechanisms that detect alterations to data in memory.

The operating system can be thought of as an interface between the application programs and the underlying hardware of the computer system. The operating system typically comprises various software routines that execute on the computer system processor and that manage the physical components of the computer system and their use by various application programs.

The processor of a computer system often includes a memory management unit that manages the use of memory by the operating system and any application programs. Many of the attacks against computer systems target programs in memory. For example, portions of code that execute security checks could be defeated by simply replacing that portion of a program when it is stored in memory. Other attacks could modify computer games and change the behavior. For example, consider a situation in which a vulnerability is discovered in a multiplayer game that allows a player to gain an unfair advantage by changing the code on his local machine. Such an unfair advantage could undermine the popularity of an otherwise popular game. All of these considerations suggest that it is highly desirable to prevent unauthorized alterations to program code.

SUMMARY OF THE INVENTION

The present invention provides a computing environment that maintains the integrity of data stored in system memory. The system has a memory management unit that maintains a plurality of real page numbers. The system also comprises an address bus in communication with the memory management unit. The address bus comprises a plurality of address lines, wherein a value of at least one address line is set as a function of a real page number by the memory management unit. The system has an operating system that controls memory usage by controlling the real page numbers accessed by the memory management unit. At least one security feature is selectively applied to data stored in a page of said memory as enabled by values of said address line set as a function of said real page number. The security feature may comprise an encryption circuit or an integrity check value circuit such as a hash circuit. The encryption circuit may comprise any well know encryption function such as an AES encryption function.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The present invention provides a secure computing environment that helps prevent attacks on a computer system involving attempts to reverse engineer, disassemble, modify or otherwise alter data including program code in a computer system memory. The present invention may be embodied in a computer system or computing device comprising an untrusted memory and a processor that has a security engine comprising an encryption and/or verification mechanism. The system uses the address bits to signal to the security engine to perform security operations on the data before storing the data in system memory. The address bits could indicate, for example, that a particular page of system memory should be encrypted. Additionally, the address bits could indicate, for example, that a particular page of memory should be protected (i.e. verifiably unaltered). In the case of protection, verification information that is a function of the data, such as a hash, is preferably stored in a tamper-resistant secure memory. A secure memory generally can be thought of as residing in a security perimeter. Typically, the security perimeter is provided by putting the secure memory on the same integrated circuit as the CPU. The verification information is reproduced from the data after it is retrieved from untrusted system memory and that verification information is compared to the stored verification information. A difference between the information indicates that the data has be altered.

Figure 1:
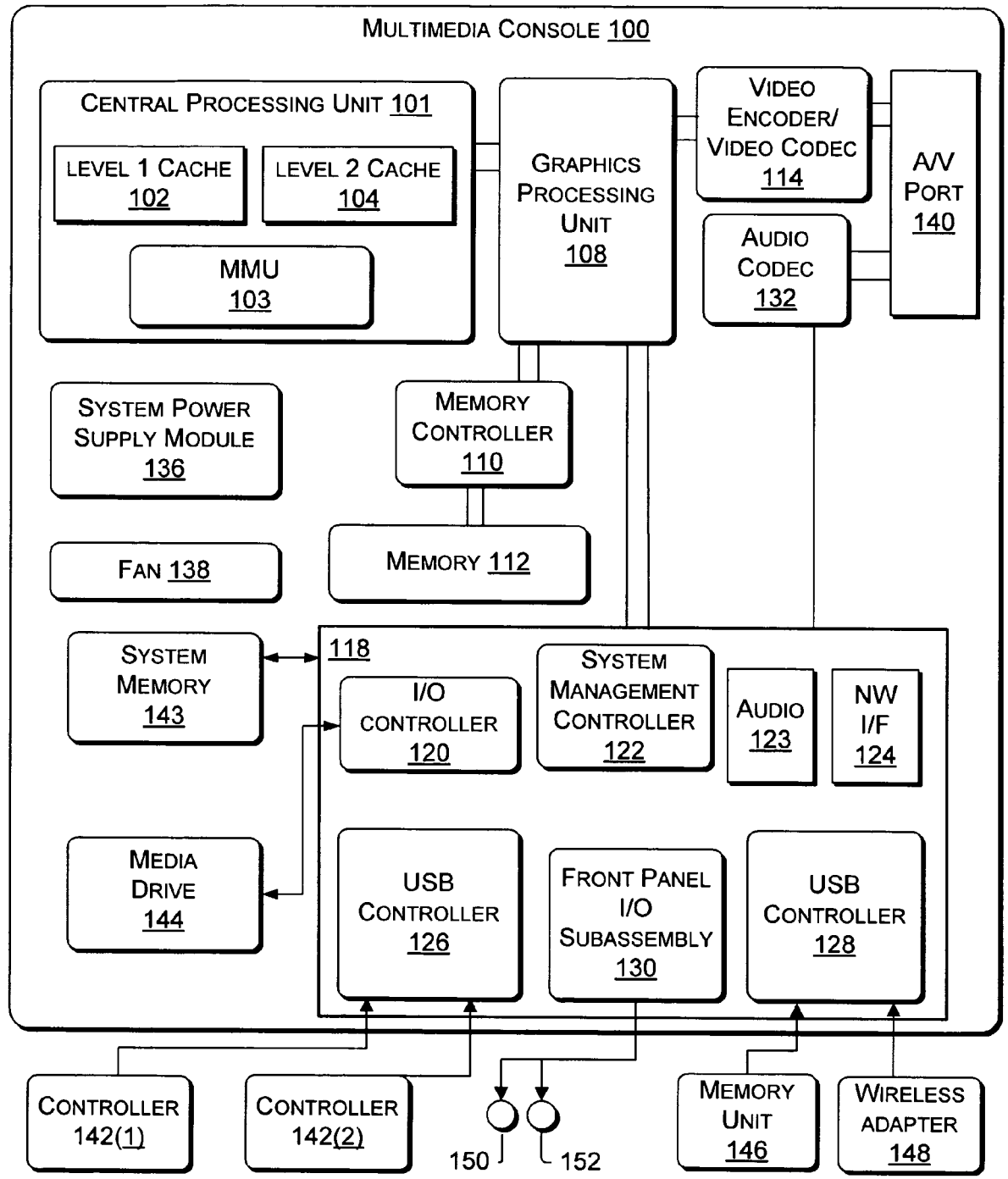
FIG. 1 is a block diagram of an exemplary computer environment in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and an MMU (Memory Management Unit) 103. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The MMU 103 is responsible for handling memory accesses requested by the CPU. Other functions performed by MMU 103 includes the translation of virtual addresses to physical addresses (i.e., virtual memory management), memory protection, cache control, and so on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

Non-volatile memory 143, e.g., flash memory, is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 136 form a corresponding audio processing pipeline with high fidelity and stereo processing. Audio data is carried between the audio processing unit 123 and the audio codec 136 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered ON, application data may be loaded from the non-volatile memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

Figure 2:
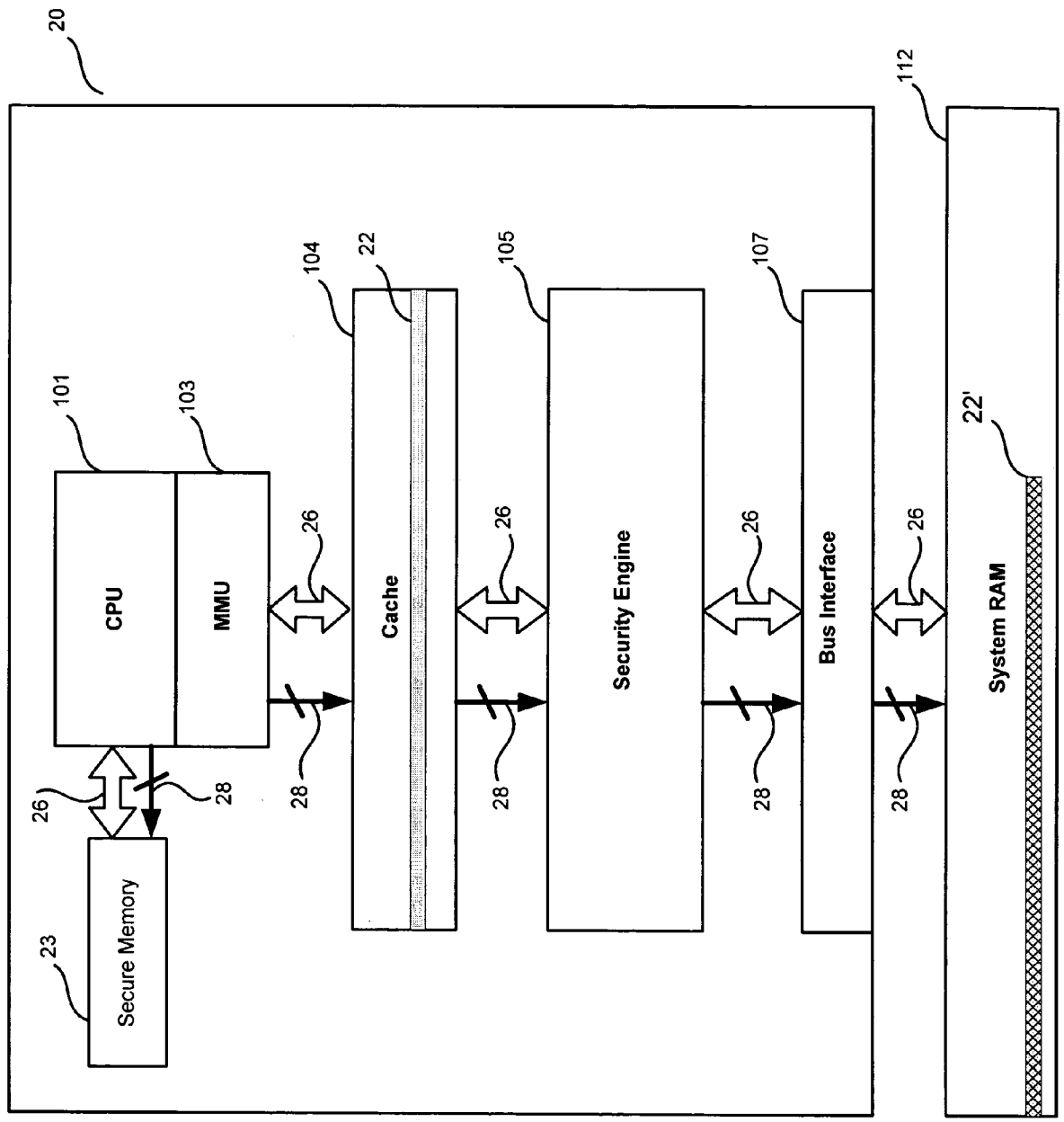
FIG. 2 is a block diagram illustrating a security engine that is incorporated into a computing environment such as the computing environment of FIG. 1.

FIG. 2 illustrates further aspects of the system of FIG. 1 wherein various components of the system are integrated to provide security features that prevent code changes, reverse engineering, tampering, and the like. An integrated device 20 comprises the CPU 101, the MMU 103, level 2 cache 104, security engine 105 and bus interface 107. The various components are interconnected by way of an address bus 28 and a data bus 26. MMU 103 controls the memory stored in Cache 104 to ensure that cache lines (e.g., 22) are moved in and out of cache 104 as needed by CPU 101. Data stored in cache 104 is operated upon by CPU 101 and hence is stored in the clear. In accordance with an aspect of the present invention, as cache lines are stored in system memory 112, the data moves through security engine 105 and may be encrypted and decrypted as it moves to and from memory 112. FIG. 2 illustrates that cache line 22 is stored in the clear while in cache 104 but is encrypted as cache line 22' when stored in memory 112.

System memory 112 is considered to be untrusted. That is, it can be compromised by an attacker and it's entire contents can be discovered and altered. Additionally, the address and data buses 28, 26 connecting bus interface 107 to system memory 112 can be monitored. On the other hand, integrated device 20 is considered to be secure. The buses 28, 26 that are internal to device 20 can not be monitored. Cache 104 is between security engine 105 and CPU 101 and is also considered to be trusted. All writes of cache 104 to system memory 112 are secured by security engine 105 as described more fully below. In addition to the system Ram 112, the system also contains a secure memory 23 that is considered to be trusted. Preferably this secure memory 23 is within integrated device 20 to prevent its busses 28, 26 from being monitored.

Memory management unit 103 handles the task of ensuring that the necessary data is in cache 104 so that CPU 101 can continue to operate efficiently. To that end, MMU 103 swaps data between cache 104 when needed instructions and data are in memory 112. According to an aspect of the invention, the security engine 105 determines the level of security to apply to data to be moved between cache 104 and system memory 112. For example, the movement of cache line 22 to memory as secured cache line 22'.

Figure 3:
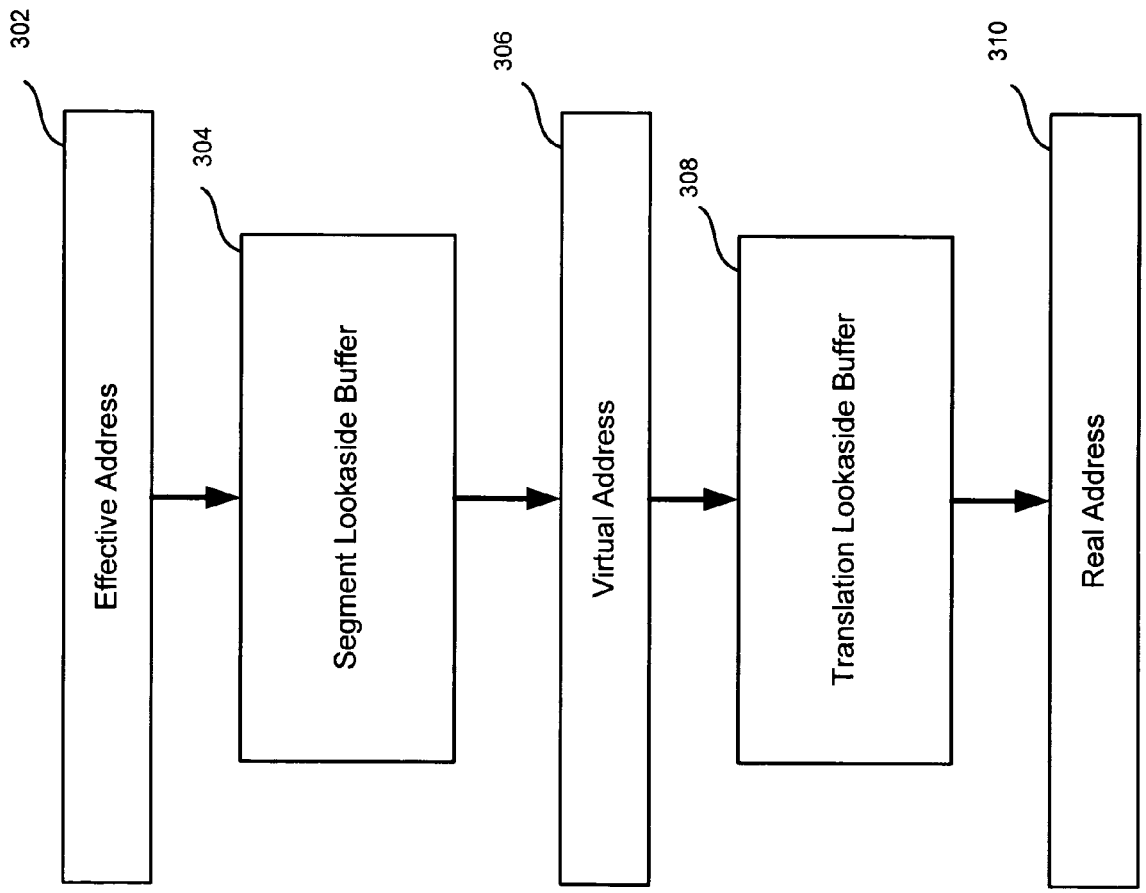
FIG. 3 is a block diagram illustrating the conversion of address spaces in an example computing environment.

Insomuch as every line of cache 104 that moves to system memory 112 has the potential to have security applied to it, it is important that the security be applied as rapidly as possible to avoid a significant performance hit to the overall system. In other words, it is desirable to provide security to data written to untrusted system memory 112 but it is undesirable to pay a significant loss of performance for that added security. An aspect of the invention is to use the address bus to provide an efficient mechanism to control the application of security. To that end, the memory management scheme employed by an example system is useful to understand how the addressing mechanism is used to determine application of security. Memory management generally takes advantage of various addressing schemes that translate a program address space into a physical address space. One such addressing scheme used by PowerPC systems uses effective address to real address conversion. FIG. 3 helps to illustrate the address translation performed in a PowerPC environment. Other addressing schemes may be used as appropriate for a different processor environment.

Referring to FIG. 3, effective address 302 is converted into real address 310 through one or more address conversion tables such as the segment lookaside buffer 304 and the translation lookaside buffer 308. A program generally operates in a contiguous address space (referred to as effective address space); however, the physical address space must accommodate and be shared by a number of applications. As such, physical address space is managed by the system and may contain any number of different programs or portions of programs. To resolve the needs of the various programs, a system allows a program to operate in an address space that appears to be contiguous but which is managed by a memory management unit that tracks the physical location of the program and data. The program operates in what is referred to as effective address space. That effective address space is translated into a virtual address space (i.e. an addressing continuum that can accommodate all of the programs simultaneously).

Figure 4:
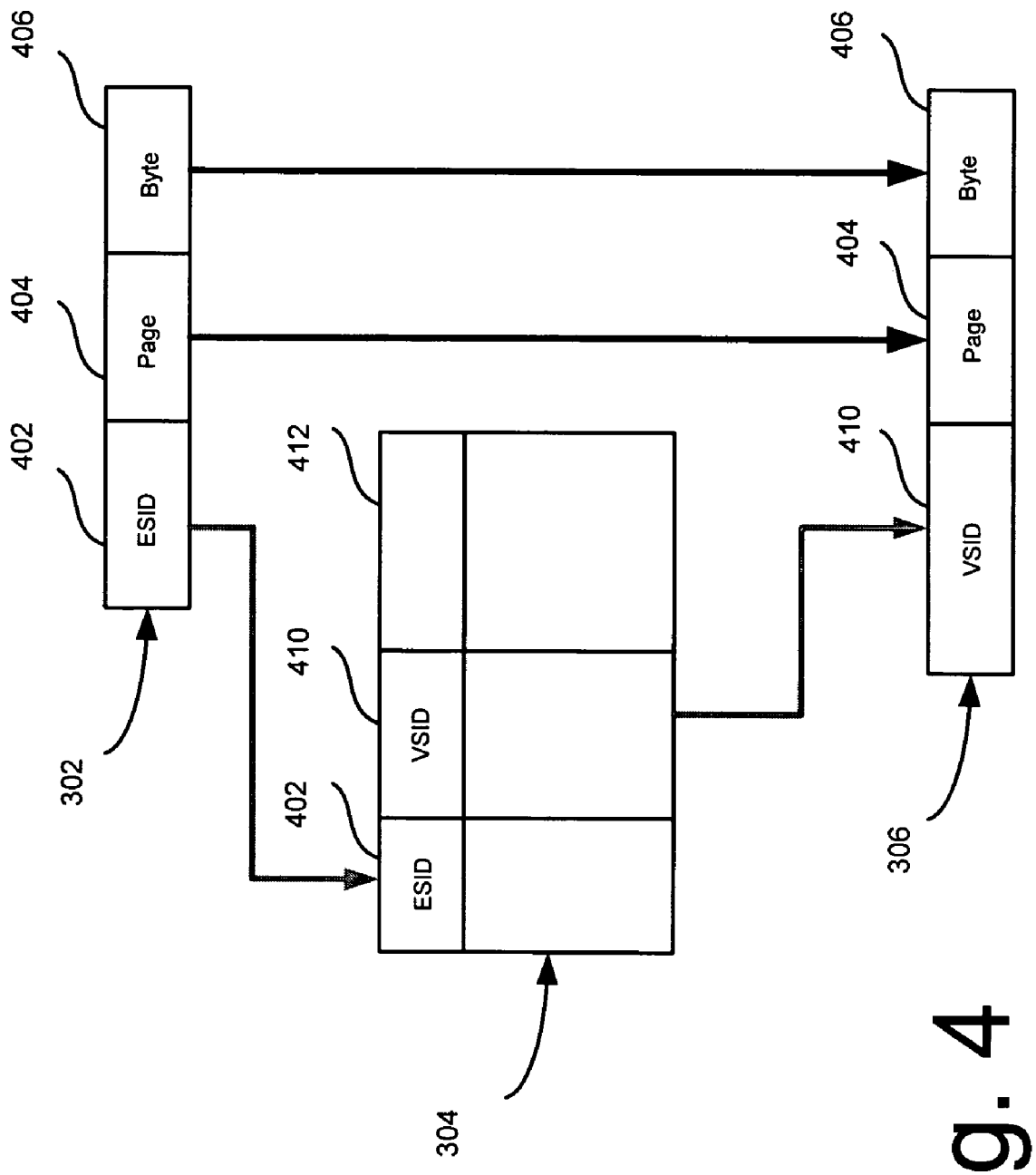
FIG. 4 is a block diagram further illustrating aspects of conversion of an effective address to a virtual address.

The effective address is the address generated by CPU 101 for an instruction fetch or for a data access. An address translation mechanism attempts to convert that effective address 302 to a real address 310 which is then used to access memory 112. The first step in address translation is to convert the effective address 302 to a virtual address 306. The second step is to convert the virtual address 306 to a real address 310. FIG. 4 provides further details of the process of converting from an effective address 302 to a virtual address 306. The Segment Lookaside Buffer (SLB) 304 specifies the mapping between Effective Segment IDs (ESIDs) 402 and Virtual Segment IDs (VSIDs) 410. The number of SLB 304 entries is implementation-dependent. The contents of the SLB 304 are generally managed by an operating system. Each SLB entry in the table 304 maps one ESID 402 to one VSID 410. The VSID then makes up the higher order bits in the virtual address 306. The remaining lower order bits, the page address information 404 and byte address information 406, are mapped directly to the virtual address 306 from the effective address 302.

The second step in the address translation is to translate a virtual address to a real address. The virtual to real translation employs the use of a page table 308'. Conceptually, page table 308' is searched by the address relocation hardware to translate every reference. For performance reasons, the hardware usually keeps a Translation Lookaside Buffer (TLB) 308 that holds page table entries that have recently been used. The TLB 308 is searched prior to searching the page table 308'. Alternatively, the page table may not be a table but rather an algorithm that generates pages as needed. Under that arrangement, when an address translation is not found in the TLB 308, a new set of TLB entries can be generated and used to update the entries in TLB 308.

Figure 5:
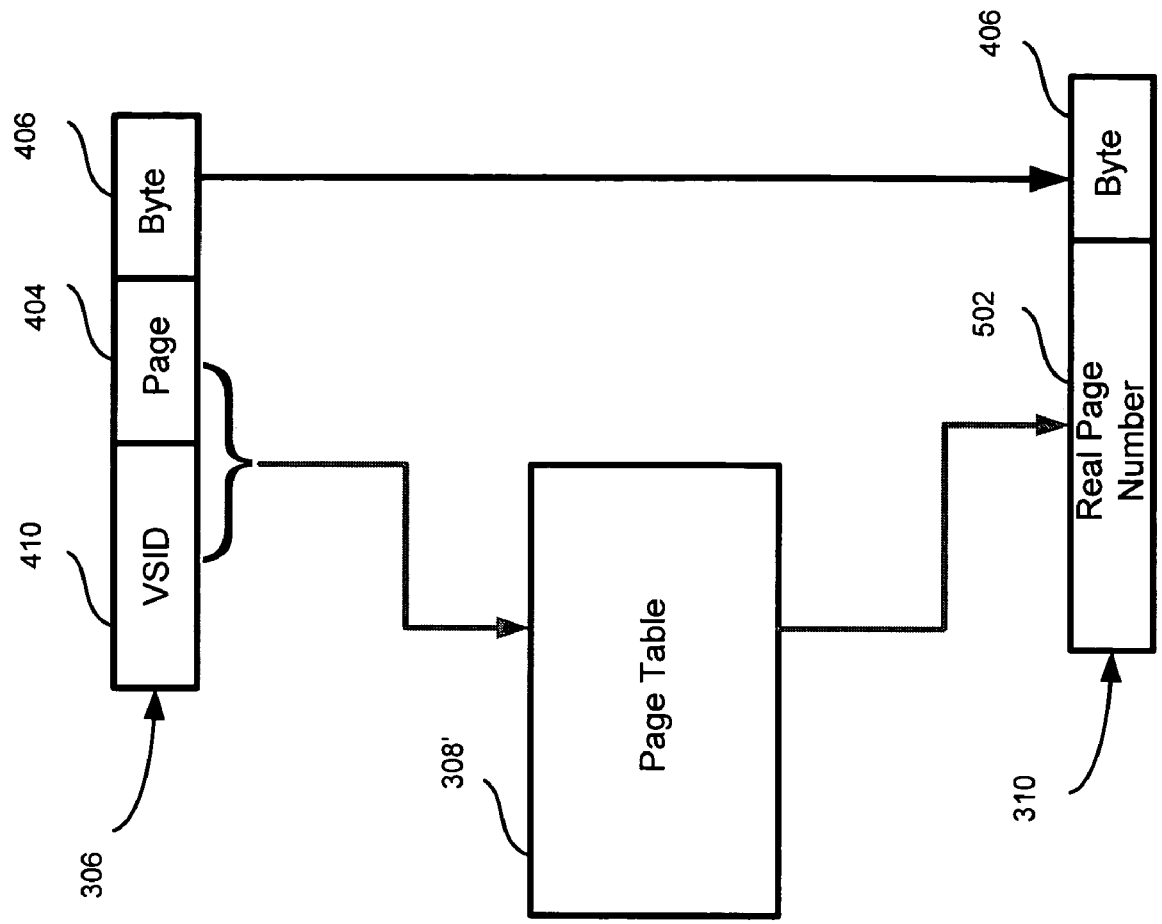
FIG. 5 is a block diagram further illustrating aspects of conversion of a virtual address to a real address.

FIG. 5 provides further details of the virtual to real address mapping. Page table 308' (as noted above portions of this page table are cached in TLB 308) is a variable-sized data structure that specifies the mapping between a virtual page number and real page numbers. The size of page table 308' is generally a multiple of 4 KB, its starting address is a multiple of its size, and it is located in storage that has limited access, i.e. it is accessible only to the operating system. VSID 410 and page address information 404 form an index into the page table 308'. The page table 308' then has a corresponding real page number 502. The real page number 502 forms the higher order bits of the real address. The byte address information 406 is translated directly from the virtual address 306.

Figure 6A:
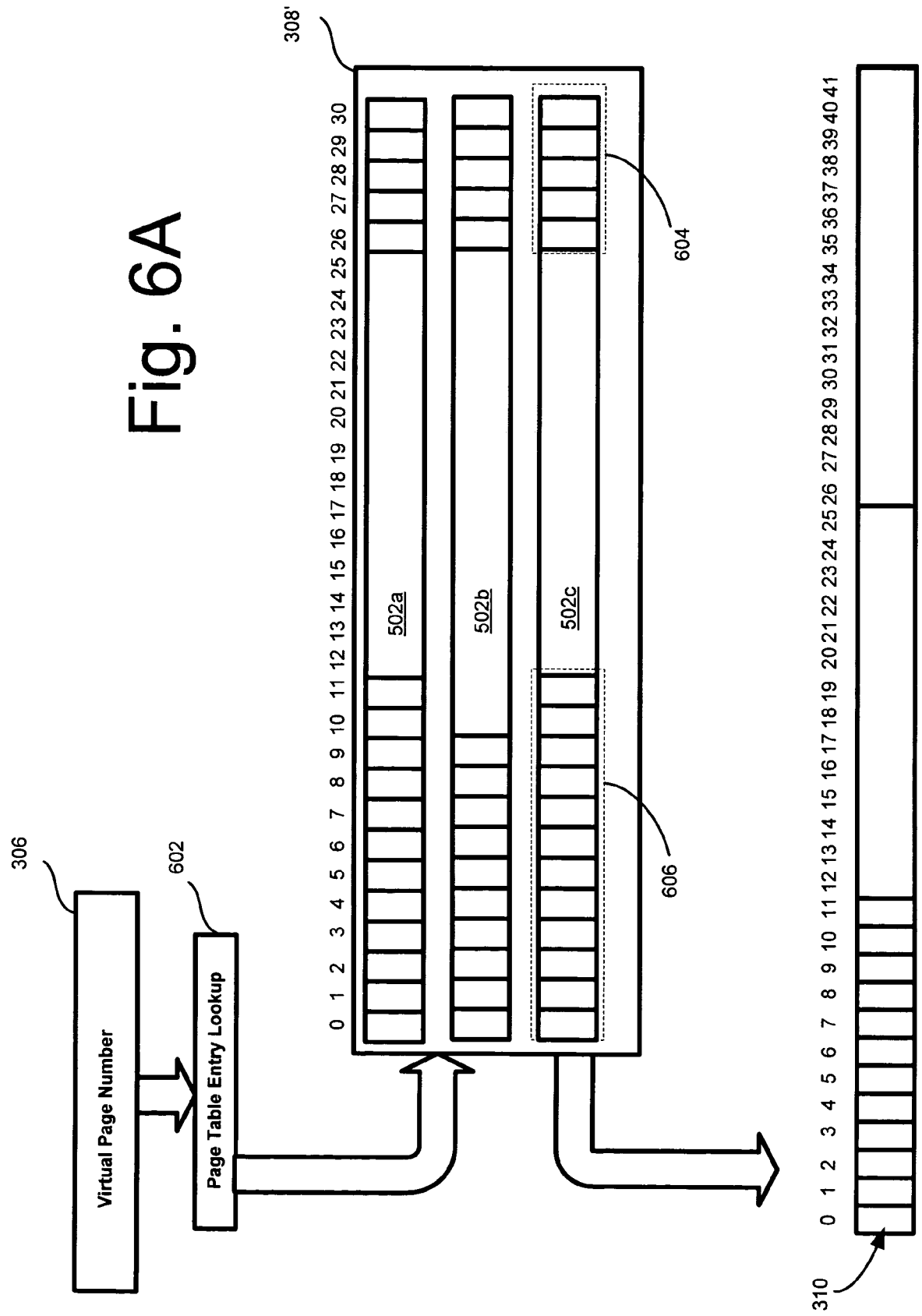
FIG. 6A is a block diagram further illustrating aspects of the invention in which address bits are set to indicate security features of the computing system.

FIG. 6A illustrates the operation of the virtual to real page number mapping. The virtual page number 306 is used to look up a corresponding page table entry 602. Each page table entry, e.g., 502a, 502b, 502c, contains a real page number, and page protection bits 604. The page protection bits 604 indicate, for example, whether a page can be read, written, etc. The high order 26 bits (i.e. 0-25) of the page table entry form the real page number 502. In addition to forming the real page address, the high order bits may also provide an indication of the security level of the page. Notably, various bits in the bits 0-11 (bits 606) provide an indication of whether a page is encrypted, protected, or neither. Additionally, the bits provide other information for encrypting and protecting a page of memory. The information stored in the real page number, including the security bits, form part of the real address 310.

Figure 6B:
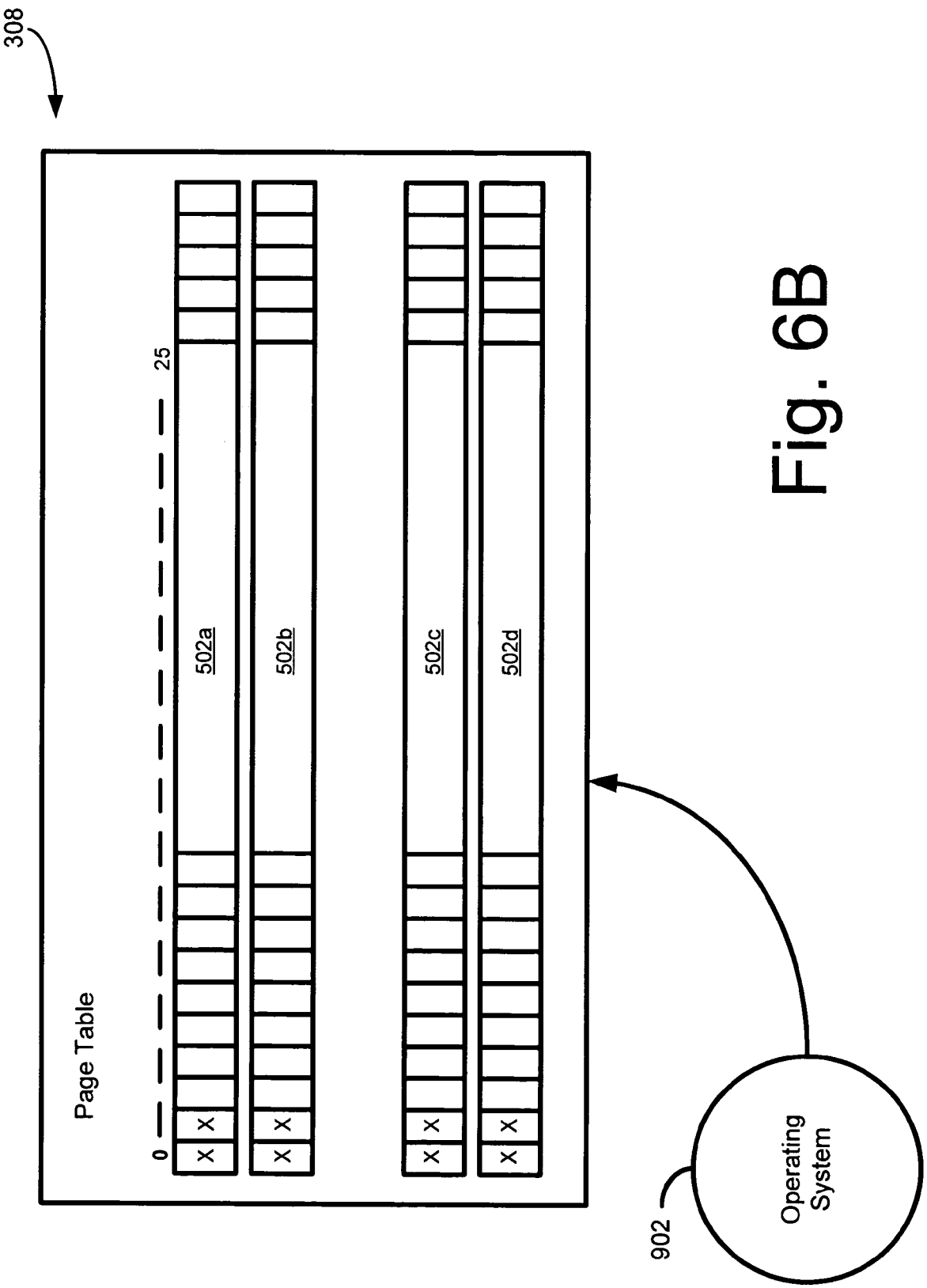
FIG. 6B is a block diagram further illustrating aspects of the invention in which address bits are set to indicate security features of the computing system.

FIG. 6B further illustrates the use of the page tables to control usage of memory. The operating system 902 controls the page table entries. That is, operating system 902 controls the page on which programs and data will reside. Operating system 902 also controls the security features, i.e., encrypted, protected, unsecure, etc. features of the data in memory. In order to facilitate the control over the security features applied to a page of memory, the operating system 902 sets the high order address bits of the real page number in the page table.

The bits in the above table correspond to the settings of the bits in the real page number that forms part of the real address. Those high order bits can then be used and decoded by the system without the need for additional tables or supplemental control circuitry. Rather, the system can simply interpret the address bits.

Figure 7:
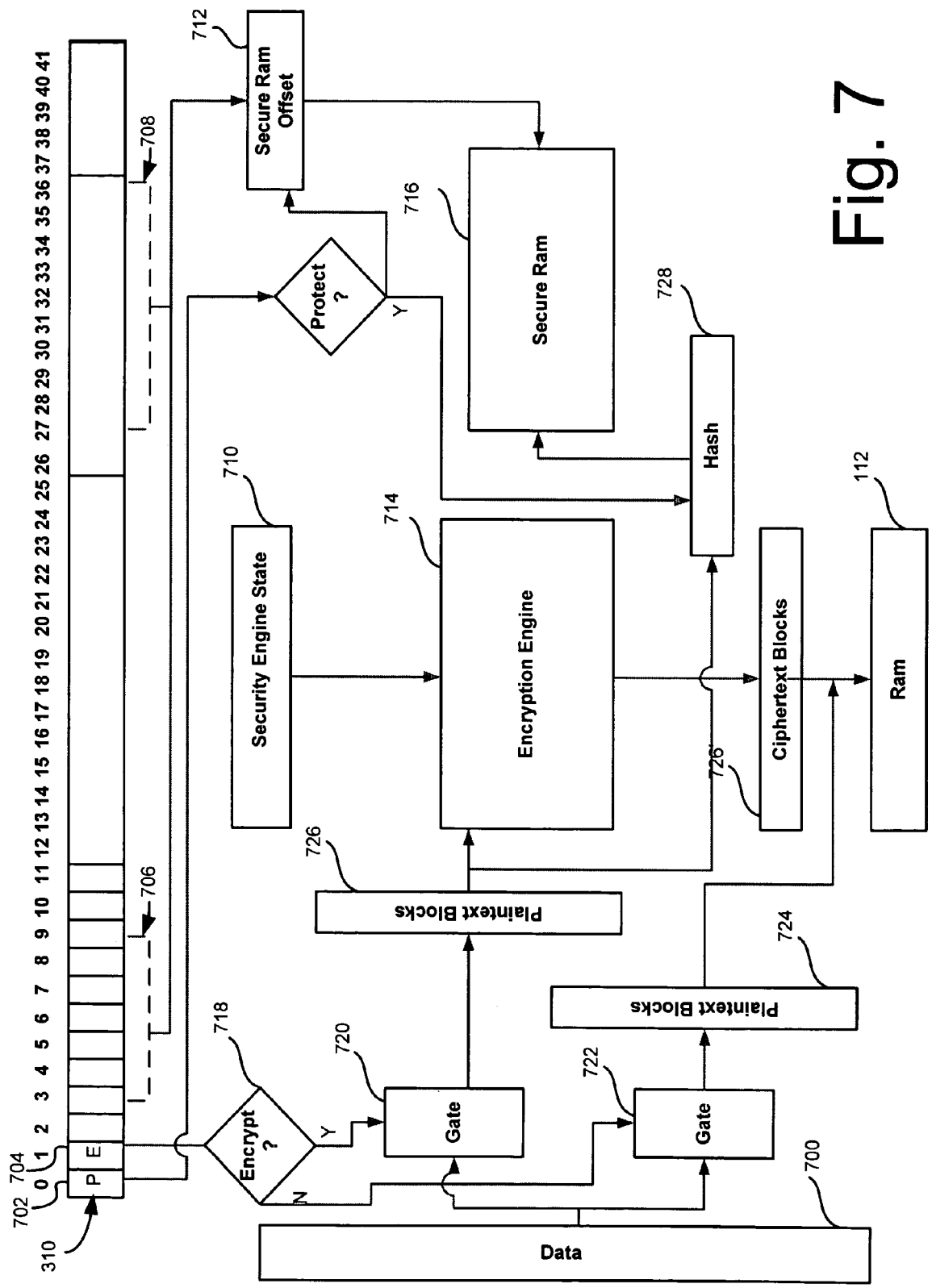
FIG. 7 is a block diagram illustrating an aspect of the security engine for encrypting and protecting data stored in memory.

Turning to FIG. 7, the security system in accordance with an aspect of the invention is further illustrated. FIG. 7 provides a block diagram that illustrates some of the functions performed by the security system. Nevertheless, various aspects of an implementation may vary, for example the decision box 718 may be implemented as a logic circuit. Other features may also be implemented in a variety of ways. In any event, the figure does serve to illustrate the general functionality performed in accordance with aspects of the invention.

As indicated, bits 0 and 1 indicate whether the addressed location is protected or encrypted. In the present illustrative embodiment, the protection is controlled on a page level inasmuch as a single page table entry is shared by all of the memory addresses in a single page. As such, all of those memory locations are subject to the same security level. If bit 0 is set, then protection is enabled. Similarly, if bit 1 is set, then encryption is enabled.

If encryption is not enabled, then gate 722 is enabled and gate 720 is disabled and the data 700 is stored as plaintext block 724 in memory 112. On the other hand, if encryption is enabled, then data 700 moves as plaintext block 726 into the encryption engine 714. The security engine state 710, e.g., encryption keys and so on, are applied by the encryption engine 714 to produce ciphertext block 726'. The encryption technique applied can be any one of the well know encryption algorithms such as AES or some variant thereof. The relevant point is that the encryption engine is driven by the address information stored in the page table. As such, a page of memory can be set as encrypted directly through the address information.

If protection is enabled (may or may not be encrypted), then a secure memory offset is determined and a hash of the data is also enabled. The secure memory offset can be a combination of the address information. Here for example, bits stored in the higher order bits, e.g., bits 3-8, are combined with lower order bits 26-34 to provide an offset into secure memory. This offset provides where the integrity check values should be stored in secure memory. In addition to the secure memory offset, a hash function is applied to the data 700. The hash can be a function of the ciphertext, the plaintext, or both. The particular hash function can be a secure hash function and can be any such function that is a function of data 700 but that is reduced in size. The calculated hash 728 is stored in the location in secure memory 716 pointed to by the secure memory offset 712. Thereafter, when the data (as ciphertext 726' or plaintext 724) is stored in memory 112 (unsecure memory), the hash value can be used to determine whether that data has been altered in memory 112. The hash value is recalculated when the data is retrieved from memory 112 and compared to the stored hash value to determine consistency. An inconsistent value would be indicative of an unauthorized change in the data while stored in memory 112.

Figure 8:
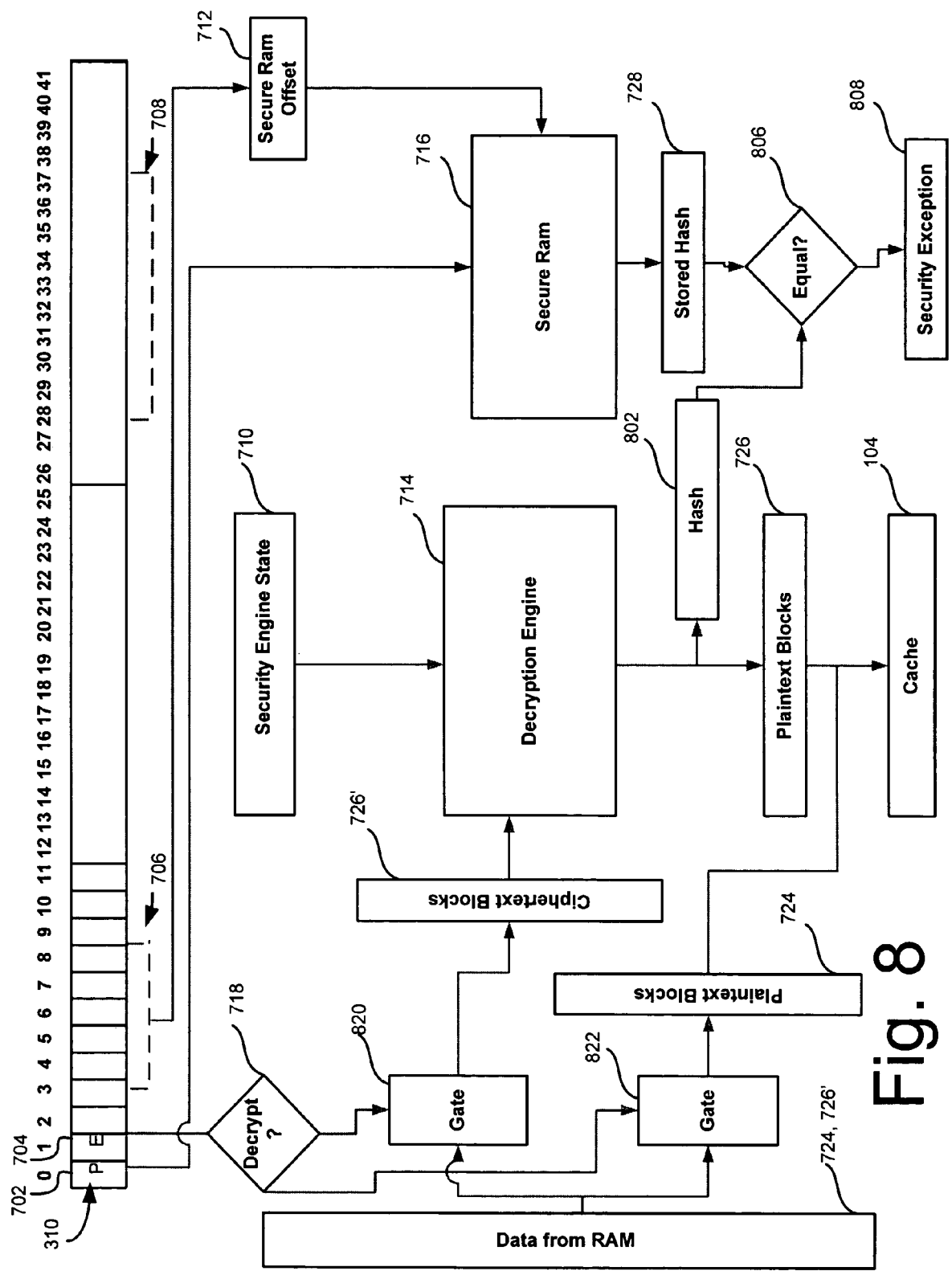
FIG. 8 is a block diagram illustrating an aspect of the security engine for decrypting and checking the data stored in memory.

FIG. 8 illustrates the reverse operation of retrieving encrypted and/or protected data from memory 112. Here, either encrypted 726' or plaintext 724 data is retrieved from memory 112. Again, the high order bits in the real address indicate the type of security to be applied. If bit 1 is set, then the data is gated through gate 820 as ciphertext (i.e., it had previously been stored as ciphertext). If bit 1 is not set, then the plaintext 724 is gated through gate 822 and stored in cache 104. Ciphertext 726', as indicated by set bit 1, is also fed into the decryption engine 714 where it is decrypted into plaintext 726 and stored in cache 104.

If the protection bit 0 is set, then the hash value 802 is calculated on the data retrieved from memory 112. In this example, the data is plaintext 726 is hashed; however, the hash function could be applied to the ciphertext data 726' and/or plaintext data. Moreover, the protection scheme could be used without encryption. The calculated hash 802 is compared to the stored hash 728 that is retrieved from secure memory 716 as pointed to by secure memory offset 712. If the stored hash 728 and the calculate hash 802 are not identical, then a security exception 808 is generated indicating that the memory has been altered.

Referring back to FIG. 2, the address bus 28 that connects the bus interface to system memory 112 preferably truncates the high order bits that are used to address memory 112. This address is referred to as a physical address because it is the actual address used to address memory 112. In the example implementation described herein, preferably, the twelve high-order bits (0-11) are truncated. That truncation would leave bits twelve through forty-one to make up the physical address.

The invention provides a system and method for ensuring the integrity and security of data stored in system RAM. By employing the address bits to indicate the security measures to apply to data stored in RAM. The security measures can be directly stored in the address translation tables without the need for a separate table that associates data with a particular security measure. To that end, the operating system keeps track of the location of integrity check values in secure memory by control over the translation lookaside buffer and page tables.

The above system and method are an example description only and are not intended to indicate that a particular addressing scheme or processor architecture is required. Rather, the example is intended to indicate the control over the address bits by way of the memory management unit to determine security measures generally.

Elements of embodiments of the invention described below may be implemented by hardware, firmware, software or any combination thereof. The term hardware generally refers to an element having a physical structure such as electronic, electromagnetic, optical, electro-optical, mechanical, electro-mechanical parts, while the term software generally refers to a logical structure, a method, a procedure, a program, a routine, a process, an algorithm, a formula, a function, an expression, and the like. The term firmware generally refers to a logical structure, a method, a procedure, a program, a routine, a process, an algorithm, a formula, a function, an expression, and the like that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include programs, code, data, files, and the like.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, and the like. A software module is coupled to another module to receive variables, parameters, arguments, pointers, etc. and/or to generate or pass results, updated variables, pointers, and the like. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

Those skilled in the art also will readily appreciate that many additional modifications are possible in the exemplary embodiment without materially departing from the novel teachings and advantages of the invention. Any such modifications are intended to be included within the scope of this invention as defined by the following exemplary claims.

What is claimed is:

1. A system for storing data in a memory, comprising:
a memory management unit comprising a table comprising a plurality of real page numbers;
an address bus in communication with the memory management unit; said address bus comprising a plurality of address lines, wherein a value of at least one address line is set by the memory management unit as a function of a value of a real page number from the table;
an operating system capable of executing in said system, said operating system cooperating with the memory management unit to control the value of the real page number stored in said table;
at least one security feature in communication with a memory, wherein the at least one security feature is selectively applied to data stored in a page of said memory as enabled by the value of said at least one address line stored in said table; and
wherein said address lines divided into two sets of address lines wherein at least one of said address lines is coupled to said security feature to enable the security feature to provide security to the data before storage in the memory, and the remaining address lines simultaneously provide the address in physical memory to store the data.

2. The system as recited in claim 1 wherein the table comprises a page table.

3. The system as recited in claim 2 wherein the most recently referenced entries of the page table are cached in a translation lookaside buffer.

4. The system as recited in claim 1 wherein the table comprises a translation lookaside buffer.

5. The system as recited in claim 1 wherein the security feature comprises an encryption circuit.

6. The system as recited in claim 5 wherein the encryption circuit comprises an AES encryption function.

7. The system as recited in claim 5 wherein the security feature further comprises a circuit that ensures the integrity of data stored in memory by generating an integrity check value.

8. The system as recited in claim 7 wherein the circuit that ensure the integrity of data stored in memory comprises a hash function.

9. The system as recited in claim 7 wherein the integrity check value is stored in a secure memory.

10. A method for storing data in a memory, comprising:
populating a table with a plurality of real page numbers;
setting a value of at least one address line of an address bus in communication with said memory by way of a memory management unit; wherein the memory management unit sets the value as a function of a real page number from the table;
controlling the real page numbers in the table by way of an operating system capable of executing in said system;
enabling at least one security feature as a function of the value of said at least one address line; wherein said address lines divided into two sets of address lines wherein at least one of said address lines is coupled to said security feature to enable the security feature to provide security to the data before storage in the memory, and the remaining address lines simultaneously provide the address in physical memory to store the data; and
applying the security feature to data to be stored in a page of memory as indicated by the value of the address line for the real page number in the memory management unit.

11. The method as recited in claim 10 wherein the table comprises a page table.

12. The method as recited in claim 11 wherein the most recently referenced entries of the page table are cached in a translation lookaside buffer.

13. The method as recited in claim 10 wherein the table comprises a translation lookaside buffer.

14. The method as recited in claim 10 wherein the applying the security feature comprises encrypting the data.

15. The method as recited in claim 14 wherein the encrypting comprises an AES encryption.

16. The method as recited in claim 14 wherein the applying the security feature further comprises generating an integrity check value as a function of the data.

17. The method as recited in claim 16 wherein the generating the integrity check value comprises applying a hash function to the data.

18. The method as recited in claim 16 comprising storing the integrity check value in a secure memory.

19. A system comprising:
a memory management unit maintaining a plurality of real page numbers;
an address bus in communication with the memory management unit; said address bus comprising a plurality of address lines, wherein a value of at least one address line is set by the memory management unit as a function of a real page number; and
at least one security feature in communication with a memory, wherein the at least one security feature is selectively applied to data stored in a page of said memory as enabled by the value of said at least one address line as indicated by the real page number in the memory management unit; wherein said address lines divided into two sets of address lines wherein at least one of said address lines is coupled to said security feature to enable the security feature to provide security to the data before storage in the memory, and the remaining address lines simultaneously provide the address in physical memory to store the data.

20. The system as recited in claim 19 wherein the security feature comprises an encryption circuit.

21. The system as recited in claim 20 wherein the security feature further comprises a circuit that ensures the integrity of data stored in memory by generating an integrity check value.

22. The system as recited in claim 21 wherein the encryption circuit is enabled by one address line and wherein the circuit that ensures the integrity is enabled by another address line.

\* \* \* \* \*